C. M. LIGON.
WRENCH.
APPLICATION FILED DEC. 27, 1916.

1,274,908.

Patented Aug. 6, 1918.

Witnesses

Inventor
C. M. Ligon
By Chandler & Chandler
Attorneys

UNITED STATES PATENT OFFICE.

CURTIS M. LIGON, OF WARREN, ARIZONA.

WRENCH.

1,274,908.　　　　Specification of Letters Patent.　　Patented Aug. 6, 1918.

Application filed December 27, 1916. Serial No. 139,068.

*To all whom it may concern:*

Be it known that I, CURTIS M. LIGON, a citizen of the United States, residing at Warren, in the county of Cochise, State of Arizona, have invented certain new and useful Improvements in Wrenches; and I do hereby declare the following to be a full, clear, and exact description of the invention, such as will enable others skilled in the art to which it appertains to make and use the same.

This invention is an improvement in tools and has particular reference to a wrench.

An object of the invention is the provision of a wrench which embodies simplicity of construction, cheapness of manufacture and in which the adjustments may be readily and quickly accomplished, and, to this end, use is made of a wedging element secured to the handle of the wrench and carrying a locking device which coöperates with the shank of the movable jaw for retaining the same in adjusted positions.

The inventive idea involved is capable of receiving a variety of mechanical expressions, one of which for the purpose of illustrating the invention is shown in the accompanying drawing, wherein:—

Figure 1:
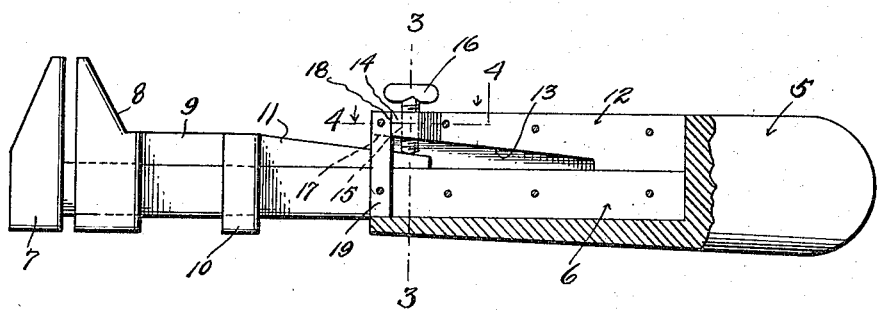
Figure 1 is a side elevation of the wrench with the handle partly broken away.
Figure 2:
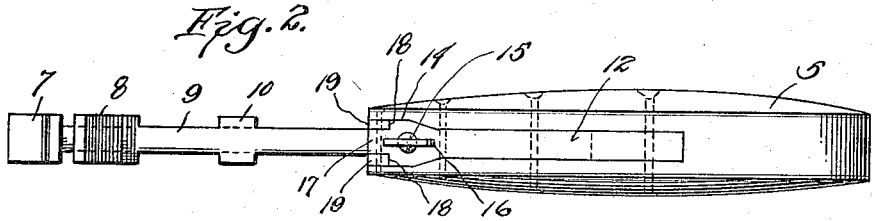
Fig. 2 is an edge elevation.
Figures 3, 4:
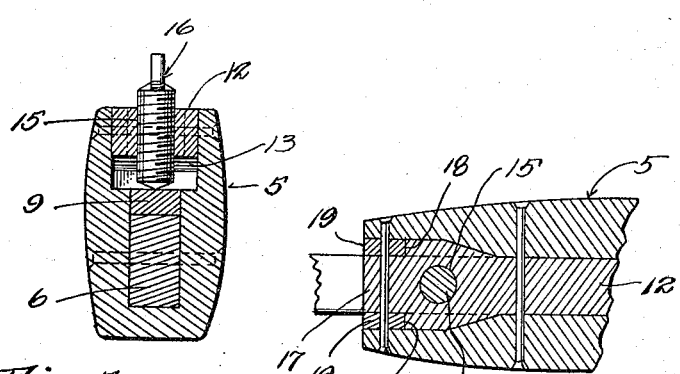
Fig. 3 is a section on the line 3—3 of Fig. 1.
Fig. 4 is a section on the line 4—4 of Fig. 1.

The embodiment of the invention shown in the accompanying drawing illustrates what is now believed to be the preferred form of the invention which comprises a handle 5 in which is mounted one end of the shank 6 the other end of which is provided with a fixed jaw 7. Slidable on the shank 6 is the adjustable jaw 8 which coöperates with the jaw 7 and which has extending therefrom a shank 9 provided with a collar 10 which embraces the shank 6 whereby the jaw 8 is guided in its adjustments. The free inner end of the shank 9 is beveled on the outer edge thereof, as indicated at 11 for a purpose which will appear later.

The handle 5 has also mounted therein a wedging element 12, a portion of the inner edge of which is adapted to abut the adjacent edge of the shank 6, the remaining portion of said wedging element being beveled as indicated at 13 to provide a tapered recess for the reception of the inner beveled end of the shank 9 whereby to permit of longitudinal adjustment of the jaw 8. The free end of the wedging element 12 which projects beyond the inner end of the handle 5 is thickened or widened as indicated at 14 and provided with a transverse screw threaded opening 15 which receives therein the locking device 16 preferably in the form of a set screw, the inner end of said device being adapted to engage the beveled edge 11 of the shank 9 and retain said shank in its adjusted positions. The extreme outer end of the element 12 is provided with a reduced extension 17 for forming oppositely disposed shoulders 18. Engaging these shoulders and secured to the extension 17 are adjacent ends of brace bars or straps 19 which are also secured, in any preferred manner, to the sides of the shank 6 and receive therebetween the inner beveled end of the shank 9. It will be seen that these braces 19 afford effective strengthening and bracing means for the wedging element 12 and also afford additional guiding means for the end of the shank 9.

In practice, should it be desired to make an adjustment of the jaw 12 it is only necessary to turn the set screw 16 until the same is disengaged from the beveled surface 11 at which time the said jaw 8 may be adjusted longitudinally until the desired adjustment is made after which the set screw 16 is again turned into engagement with said beveled surface 11. It will be apparent from this construction that a binding action will be secured between the set screw 16, the shank 6 and shank 9 and that this binding action will be increased in proportion to the pressure exerted upon the handle 5 when tightening a nut.

What is claimed is:—

A wrench comprising a handle formed with a slot therein, a shank having one end mounted in said slot and a fixed jaw at its other end, an adjustable jaw slidable on said shank and also provided with a shank having an outer beveled edge, a wedging element mounted in said slot and having a portion of one edge engaging the adjacent edge of the first named shank, the remaining portion of said edge being beveled to provide a recess between the same and the adjacent edge of the first named shank for the reception of the shank of said adjustable jaw, the outer end of said wedging element having a screw threaded opening and provided with a reduced extension forming shoulders, transverse bracing elements at the inner end of said handle secured to the first named shank and to said reduced extension and engaging said shoulders and forming guides for receiving therebetween the adjacent end of the shank of said adjustable jaw, and a locking device mounted in said screw threaded opening and engaging the beveled edge of the last named shank for retaining the same in adjusted positions.

In testimony whereof, I affix my signature, in the presence of two witnesses.

CURTIS M. LIGON.

Witnesses:
P. M. BYERLY,
J. G. CRITCHLY.

Copies of this patent may be obtained for five cents each, by addressing the "Commissioner of Patents, Washington, D. C."